United States Patent [19]
Morse

[11] 3,889,884
[45] June 17, 1975

[54] HAY PRODUCT AND METHOD FOR FORMING

[76] Inventor: George W. Morse, 9444 S. Wales Way, Elk Grove, Calif. 95624

[22] Filed: Feb. 9, 1973

[21] Appl. No.: 331,207

[52] U.S. Cl. .................................. 241/24; 241/80
[51] Int. Cl. ................................ B02c 19/00
[58] Field of Search ............... 241/24, 79, 79.1, 80

[56] References Cited
UNITED STATES PATENTS

| | | | |
|---|---|---|---|
| 887,693 | 5/1908 | Richmond | 241/80 |
| 994,596 | 6/1911 | Marks | 241/80 X |
| 1,097,919 | 5/1914 | Edrall et al. | 241/80 X |

*Primary Examiner*—Granville Y. Custer, Jr.
*Attorney, Agent, or Firm*—Flehr, Hohbach, Test, Albritton & Herbert

[57] ABSTRACT

A method for preparing a readily pelletizable product from a pulverized finely divided alfalfa hay product. The hay powder is centrifugally separated in a chamber into an overflow and underflow portion. Some of the underflow containing heavier and larger particles than the overflow, is recycled to the separation chamber so that the average size of the overflow particles is substantially increased. Recycling increases the average size of the overflow particles to a sufficient extent that they are readily formed into durable pellets particularly well suited for animal litter.

4 Claims, 1 Drawing Figure

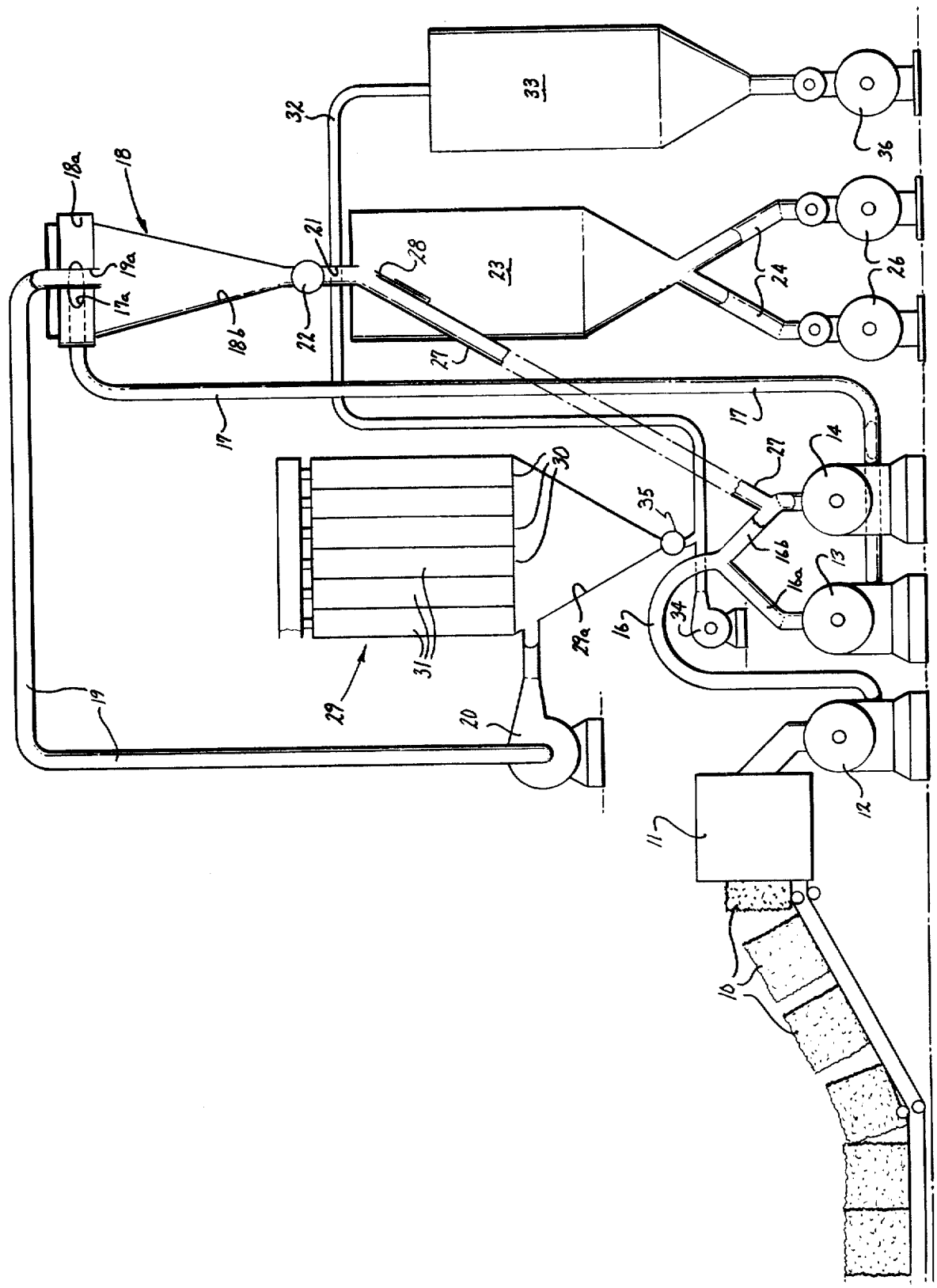

HAY PRODUCT AND METHOD FOR FORMING

BACKGROUND OF THE INVENTION

It is conventional to pelletize alfalfa and other leafy legumes for use as feed and the like by pulverizing the hay and directing the same to a cyclone centrifuge for separation of light, fine dust particles in an overflow air stream from the heavier particles in the underflow stream. The heavy particles, which are known to contain a relatively high fiber content compared to the fines, are directed to a pelletizer wherein they are moistened and compressed to form pellets. About 1 to 2% by weight of the light, fine dust particles based upon the pelletized material are conventionally removed as overflow from the cyclone and discarded.

The foregoing alfalfa feed pellets have been reduced in size by grinding to smaller granules suitable as an odor and liquid absorbing animal litter. The chlorophyll content of such alfalfa granules assists in masking the odor of the animal waste.

One problem with the foregoing procedure for pellet formation is that the fines removed in the overflow from the cyclone, containing a relatively high content of chlorophyll, are discarded which could otherwise be used effectively for products such as the animal litter. Furthermore, since the pellets have a relatively large fiber content (low in chlorophyll) the granules formed therefrom for use as animal litter have a reduced chlorophyll content which lowers its odor masking properties. Also, it is known that the leafy material contains a relatively high proportion of latent adhesive material, which is activated by the addition of moisture for the formation of pellets, in comparison to the fibrous material. Thus, the pellets having a relatively large fiber content, are somewhat disintegrable. This feature is undesirable for an animal litter since small fragments of the material can be spread and tracked during movement of the animal away from the litter container.

SUMMARY OF THE INVENTION AND OBJECTS

It is an object of the present invention to produce a new hay product by an economical process which overcomes the aforementioned disadvantages of the prior art.

It is a particular object of the present invention to produce an alfalfa hay product utilizing cyclone centrifuge overflow fines which are conventionally discarded.

It is another object of the invention to produce a pelletized product of the foregoing type particularly suitable for use as animal litter.

Additional objects and features of the invention will be apparent from the following description in which the preferred embodiment of the invention has been set forth in detail in conjunction with the accompanying drawing.

The present process is predicated upon a discovery that hay dust particles (which are conventionally removed as overflow and discarded in a conventional cyclone centrifuge operation prior to pelletizing of the underflow) can be combined with recycled heavier underflow particles to form a desirable product which can be pelletized to form an excellent animal litter. More specifically, the process includes feeding a pulverized finely divided hay powder formed of a leafy legume (e.g. clover or alfalfa) under pneumatic pressure tangentially to a body of the same in a cyclone centrifuge wherein the body is caused to rotate about its axis with application of centrifugal separating forces. An overflow is continually removed from a region adjacent its axis and the solid particles are removed therefrom. An underflow is continuously removed from one end of the body, which underflow contains centrifugally separated particles which are heavier and larger than the overflow particles. During the process, a significant portion of the underflow particles are recycled to the cyclone so that the average size and weight of the overflow particles are substantially increased. The overflow particles have a reduced fiber content (and thus have a higher chlorophyll content and are more adhesive in the presence of moisture than the hay feed powder). The overflow is also of a relatively large size in comparison to the discarded dust particles in conventional processing. The overflow particles may be moistened and compressed into pellets particularly well suitable for animal litter.

BRIEF DESCRIPTION OF THE DRAWING

The drawing is a schematic representation of apparatus incorporating the invention suitable for carrying out the method.

DETAILED DESCRIPTION OF THE PREFERRED EMBODIMENTS

In general, the present method makes use of a hay powder formed by dehydration of a leafy legume. Particularly suitable leguminous materials include a leafy vein-containing portion and a stem portion in which the leafy portion contains a latent adhesive material activated by contact with moisture. As explained hereinafter, this property enables the product of the present invention to be readily pelletized. Another property of the hay feed material, particularly important when the product of the present invention is used in a pelletized form in an animal litter, is that the hay contain a significant quantity of chlorophyll for masking animal waste odors. Suitable hays of the foregoing type include alfalfa and clover. For convenience, the present description will utilize the former one as the hay product of the present invention.

Referring to the drawing, an apparatus is illustrated suitable for carrying out the present invention. The alfalfa hay is supplied in the form of bales 10 which are conventionally fed into a bale breaker 11 which disintegrates the hay bales 10 into a suitable form for grinding. A typical input of hay into the system may be on the order of 10 tons per hour. The disintegrated hay from bale breaker 11 is thereafter further pulverized by suitable pulverizing means prior to being pneumatically conveyed to a separation chamber as set forth hereinafter. In the illustrated embodiment, the pulverizing means comprises three grinders suitably swinging hammer hammer-mills. The first grinder 12 is fed with the disintegrated hay material from bale breaker 11 and includes a screen for passing particles after grinding of a relatively coarse nature, say ¾ to 1 inch in diameter or less. The coarse particles are thereafter pneumatically conveyed into parallel streams to second grinder 13 and third grinder 14 by conduit 16 which includes a forked portion with arms 16a and 16b for splitting the stream. The pulverized powder removed from grinders 13 and 14 is of a size small enough for pneumatic conveyance. For this purpose, it is preferable to pass the particles through a screen having a porosity less than ¼ inch, preferably ⅛ to 1/16 inch or less.

The pulverized finely divided hay powder from grinders 13 and 14 is pneumatically conveyed in conduit 17 to means forming a substantially axially symmetric separation chamber 18. Chamber 18 includes an upper generally cylindrical portion 18a and a lower downwardly directed conical portion 18b. Assuming the apparatus is in an upright position as illustrated in the drawing, which is generally the case, conduit 17 terminates in an opening 17a for introducing the pneumatically conveyed particles at the periphery of chamber portion 18 in a generally tangential direction.

Means for withdrawing the overflow of feed material from chamber 18 comprises a conduit 19 with a vortex finder pipe portion 19a having an opening projecting into chamber 18. As set forth hereinafter, pipe 19 communicates with fan means 20 which is operable to create a lower pressure or suction at its inlet side sufficient for the pneumatic conveying (a) through conduit 16 to grinders 13 and 14, (b) through conduit 17, and (c) for assisting the withdrawal of the overflow through conduit 19 as set forth hereinafter. For vertical positioning as illustrated in the drawing, the inner open end of pipe portion 19a is positioned at a level below the feed entry zone of conduit opening 17a in order to prevent short circuiting of feed material into the pipe prior to separation in the chamber.

Means for discharging underflow from separation chamber 18 is provided comprising vertical conduit 21. As set forth above, fan means 20 creates a low pressure zone at the opening of conduit 19 for the withdrawal of the overflow particles. To permit the underflow to freely fall through conduit 21, it has been found desirable to provide means for counteracting the negative pressure in overflow conduit 19 by suitable means such as a conventional rotary air lock 22 at an upper portion of conduit 21. Lock 22 suitably comprises a spoke or vane star-shaped configuration transverse to the conduit with the ends of the spokes or vanes mating in sealing engagement with the inner wall of the conduit. Lock 22 is actuated by suitable power means (not shown) for rotation at a speed (e.g. 40 rpm) sufficient to counteract the aforementioned negative pressure in conduit 19 to permit the relatively free gravitation of the heavier underflow particles through conduit 21.

A collection tank 23 is disposed below conduit 21 for gathering all or a part of the underflow particles from separation chamber 18. The underflow particles may be used in this form for feed and the like. Alternatively, as illustrated in the drawing, the underflow may be further processed by conveying through a suitable conduit such as pipes 24 to one or more conventional pelletizing mills 26. Suitable pelletizing mills for this purpose are of the ring-die type such as sold by (a) California Pellet Mill Co. of San Francisco, Calif. under the designation Model 200 or (b) Sprout, Waldron & Co. of Muncy, Pa. under the Model 26-250.

Means forming a conduit is provided for recycling a predetermined portion of the underflow particles from the lower portion of separation chamber 18 to the upper or feed portion thereof. Such means suitably includes conduit 27 interconnecting conduit 21 and the inlet side of grinder 14 at conduit arm 16b for mixing with the hay feed powder prior to introduction into grinder 14. Conduit 27 includes an opening disposed below conduit 21 and an adjustable valve suitably comprising sliding gate 28 operable between a first and second position. In a first position, not shown, gate 28 closes the opening in conduit 27 so that essentially all underflow is directed into the same instead of collection tank 23. In a second position gate 28 is moved to expose an opening through conduit 27 which permits essentially all of the underflow in conduit 21 to gravitate into collection tank 23. The proportion of underflow which is recycled to form a part of the overflow is controlled by the position of gate 28 between these two extremes.

In the illustrated embodiment, conduit 27 passes the underflow material through grinder 14 for further pulverizing and thereafter mixes the same with the material being pneumatically conveyed as hay feed material through conduit 17. It should be understood that, if desired, a recycle line may be independently connected to a peripheral portion of separation chamber 18 or may be linked to conduit 17 at a point downstream of grinder 14 to eliminate further grinding.

The overflow particles pneumatically conveyed in conduit 19 are directed to the upstream low pressure side of fan means 20 and from there through a suitable conveyor to means for separating the fine particles or dust from the pneumatic conveying gas, typically air. In the illustrated embodiment, such separation means comprises a conventional dust filter housing 29 including a filter hopper 29a and a plurality of filters 30 disposed transversely across discharge stack outlets 31. Filters 30 are suitably formed of "socks" of a fabric or other material with a porosity sufficient to permit the passage of air and only extremely fine particles but which cause the accumulation of the major portion of the particles being urged thereagainst under the positive pressure from fan means 20. Hopper 29 includes a lower conical portion 29a in which the overflow particles from chamber 18 are collected. Compressed air supply means, not shown, is provided to intermittently remove any overflow particles which accumulate on the lower surface of the filter and cause the same to fall into conical portion 29a. The air may be directed against either side of the filter for this purpose.

The overflow material accumulating in hopper 29 is directed in a suitable conduit 32 for collection in the storage tank 33 for further processing if desired. The positive pressure for pneumatic conveyance in conduit 32 is supplied by a second fan means 34. A rotary air lock 35 of the same general type as lock 22 is provided below hopper 29 to permit dust from the hopper to gravitate relatively freely into conduit 32 thereby preventing reverse flow of the particles back to the hopper by the influence of fan 20.

In the illustrated embodiment, the material in storage tank 33 drawn from separation chamber 18 is conveyed to a conventional pelletizer 36 such as of the ring-die type described above with respect to pelletizing mills 26.

The process of the present invention will now be described utilizing the foregoing apparatus. Alfalfa hay bales 10 are fed into bale breaker 11 and are thereafter pulverized in hammermill grinder 12 to a coarse size, say which passes through a screen having ¾ to 1 inch openings. Thereafter, the relatively coarse material is further pulverized in grinders 13 and 14 having a screen to permit the exit into conduit 17 of hay powder no greater than, e.g. ¼ to ⅛ inch, a desired size for centrifugal separation. The powder removed from grinders 13 and 14 is a finely divided powder including deveined leaf blade particles, the leaf vein particles removed from the blades, and stem particles. This powder is pneumatically conveyed to grinders 13 and 14 and from there through conduit 17 and 19 under negative pressure created by fan means 20. Conduits 16, 17 and 19 have inner diameters on the order of 18 inches. For a system feeding 10 tons of hay per hour to bale breaker 11, the total air velocity is typically on the order of 8,000 cubic feet per minute.

The finely divided powder in conduit 17 is continuously supplied under pneumatic pressure tangentially to a peripheral portion of separation chamber 18 wherein a body of the powder is caused to rotate about its axis with application of centrifugal separating forces. Definite force patterns develop as the fine powder accelerates rapidly and uniformly in a downwardly and inwardly spiraling path to an inner vortex coincident with the axis of separation cyclone 18. A solid particle of the powder having a given mass and shape progresses inwardly towards the lower vortex while encountering centrifugal force fields of ever-increasing densities. The degree of the inward displacement of the particle is an inverse function of (1) the centrifugal force field intensity and (2) its relative mass. When the mass of the solid particle is sufficient to overcome the inward component, it orbits about the axis of rotation in the cyclone chamber 18. Due to frictional resistances inherent in the body of the cyclone, all orbiting particles of a similar mass and shape decelerate in relation to the smaller particles until the downward component is of a magnitude sufficient to overcome the effects of both the centrifugal force and fluid flow components. When this occurs, the particles proceed in a downward moving path essentially parallel to the wall of chamber portion 18b until they reach rotary air lock 22.

The heavier particles which reach air lock 22 are scraped from the walls of the separation chamber by the vanes of lock 22 rotating at a sufficient speed (e.g. 40 rpm) to overcome the suction created in conduit 19 as explained more fully hereinafter. A major portion of the conveying air fed in conduit 17 is removed in the overflow. The underflow particles in conduit 21 having a relative large size and high specific gravity are discharged as underflow. Such underflowing material has a significantly increased fiber content including the stem and leaf vein particle than the overflow particles removed in conduit 19. This is because the fiber content of the hay is substantially denser than the remainder of the hay comprising leaf blade particles. Furthermore, such heavy dense fibrous particles are more difficult to pulverize than the leaf blade paticles and so are generally larger in size in the powder. This causes the underflow to not only be denser but also larger in size than the overflow.

Particles with a relatively small mass, such as leaf blade particles, move toward the inner vortex of section 18a more readily than the fibrous particles having a relatively large mass. A portion of these lower mass particles are displaced and withdrawn at the vortex through conduit opening 19a under the influence of the natural swirling effect of the conveying air entering from conduit 17 and also of the reduced pressure in conduit 19 created by fan means 20.

In accordance with the present process, a significant portion of the underflow particles, containing centrifugally separated particles which are heavier than the overflow particles, are continuously recycled through line 27 into the body of rotating materials in the upper portion of chamber 18. It is is preferred to recycle at least 10 to 30 percent or more of the underflow particles to obtain the advantages set forth hereinafter. In the illustrated embodiment, the recycled heavy underflow particles are directed through conduit 27 into grinder 14 and passed therefrom in a screen which allows particles no greater than, say, one-eighth inch to pass into conduit 17 for mixing with the feed material for peripheral feed into the body of particles rotating in chamber 18.

The recycling of the relatively heavy particles increases the solid to air density in the cyclone and enables a substantially increased removal of overflow particles. It is preferable that the weight ratio of removed overflow particles in conduit 19 to underflow particles in collection tank 23 be on the order of a least 5 to 10 or more parts of the former to 95 or 90 parts or less of the latter.

The overflow particles in conduit 19 are drawn through the negative pressure side of fan means 20 and out the positive pressure side thereof into dust filter sock housing hopper 29 in which the air and extremely fine particles are permitted to pass through the filter socks with the great majority of the fed particles on the surface thereof or gravitating into the hopper. Any particles which have accumulated on the filter sock 30 are intermittently back flushed with compressed air and the like to cause the particles to also be deposited in the hopper. Upon filling the hopper with alfalfa particles, they are pneumatically conveyed under positive pressure created by fan means 34 comprising an air pump and collected in storage tank 33.

The material in storage tank 33, designated the overflow product, may be utilized in a loose form, as for feed, thus making use of formerly discarded material. For use as animal litter, it is pelletized in a conventional pelletizing mill 36 as of the foregoing type. Moisture, as in the form of steam, is preferably supplied to the material to assist the pelletizing by activating latent adhesive material of the alfalfa powder so long as the total moisture content does not exceed the desired quantity for pelletizing. As is known to those skilled in the art, such moisture contents may be on the order of about 10 to 20 percent, depending upon the composition of the material to be pelletized. The size of the formed pellets may be varied in accordance with the desired final product. A suitable pellet size for use as in animal litter of the product pelletized in pelletizing mill 36 is from ⅛ to inch and preferably on the order of 5/32 inch. Also, heat may be supplied to assist pelletizing.

That portion of the underflow product exiting separation chamber 18 through conduit 21 which is not recycled through line 27 is accumulated in collection tank 23. If desired, such material may also be pelletized in the foregoing manner by the utilization of pelletizing mills 26. It is apparent that all material is removed either as an underflow product or an overflow product.

It has been found that recycling of a significant portion (e.g. at least 10 to 30 percent) of the underflow from separation chamber 18 produces an underflow of particles having an average size and weight substantially increased compared to the overflow particles without recycling. As set forth above, before the present invention, in conventional processing this latter overflow product had been discarded because it is so light and small and has such free flowing characteristics as to be carried away in the mildest of air current. Such aerodynamic properties render this product extremely difficult to pelletize or use in any other manner.

In contrast to fines of the above conventional type, it has been found that the present product containing the relatively larger and heavier recycle material is readily compressible and adhesive in the presence of moisture to facilitate the formation of pellets. The presence of the relatively larger recycle particles in the overflow greatly reduces the propensity of the surface of a mass of the material to float away in the slightest air current. For this purpose, it is preferable that the size of the particles collected in storage tank 33 for pelletizing be such that at least 20 to 50 percent or more of the particles be retained on a 150 standard mesh screen. It is preferable for at least 20 percent of the overflow particles to be of a size larger enough for retention on a 150 mesh screen. A typical screen analysis of applicant's overflow product is set forth in Table I below:

TABLE I

| Mesh Sizing | % Retained By Screen |
|---|---|
| 65 | 0.3 |
| 80 | 1.6 |
| 100 | 7.3 |
| 150 | 37.5 |
| 200 | 19.2 |
| 325 | 22.0 |
| passing 325 | 11.6 |

The results of Table I are to be contrasted to the standard fines product described above in which on the order of 10 percent or less of the powder is retained on a 150 mesh standard screen.

Because the overflow product is relatively light in comparison to the feed material, it correspondingly has a significantly decreased fiber content, the densest portion of the hay, in comparison to the hay feed material. This reduction may be on the order of 20 percent or more. By way of example, the fiber content of a typical alfalfa hay feed material is on the order of 25 percent. In contrast, the product of the present invention has a fiber content no greater than 18% and preferably on the order of 12 percent.

Another advantage of the present process, particularly apparent when the overflow product fed to tank 33 is pelletized and utilized as animal litter, is derived from the fact that the chlorophyll content of the leafy material in the hay is substantially higher than in the fibrous veins or stem. Since, as set forth above, the overflow product is relatively low in fiber content, it is correspondingly relatively high in chlorophyll content in comparison to conventional alfalfa pellets used for animal litter. For example, applicant's product has a chlorophyll content on the order of from 60 or 70 to 90 mg/gm while conventional alfalfa has a chlorophyll content on the order of 10 to 40 mg/gm. Such high chlorophyll content in applicant's product assists in masking the odors of animal wastes, an important feature of animal litter.

Another advantage of applicant's product is its durability when used as animal litter in comparison to conventional alfalfa pellet fragments. This is believed to be the result of the increased leafy material compared to fiber content in applicant's overflow product which leafy material is known to contain a relatively high proportion of latent adhesive material which is activated in the presence of moisture to form a firm aggregate.

During pelletizing of the overflow particles in tank 33 for use as an animal litter, the product is substantially compressed to form a final product of a bulk density on the order of 40 to 50 pounds per cubic foot in 5/32 inch diameter pellets. The unit density of applicant's pelletized product is on the order of 60 to 80 pounds per cubic foot in comparison to 45 to 50 pounds per cubic foot for conventional pellets. Such higher density gives applicant's product more structural stability in the dry state and renders it more moisture resistant than conventional pellets.

I claim:

1. A method for preparing a readily pelletizable pellet from a pulverized finely divided hay powder formed of a leafy fiber containing legume and including stem particles, leaf vein particles, and deveined leaf blade particles, comprising the steps of continuously supplying said hay powder under pneumatic pressure tangentially to a centrifugal separation chamber whereby said powder is caused to rotate abouts its axis with application of centrifugal separating forces, continuously removing an overflow from a region adjacent said axis and collecting said overflow as a first product, separating the overflow solid particles and gas, continuously removing an underflow from one end of the chamber and collecting said underflow as a second product, said underflow containing centrifugal separated particles which are heavier and larger than said overflow particles, continuously recycling at least 10 percent by weight of said underflow particles to mix with said supply of hay powder, whereby the average weight of said overflow particles is substantially increased in comparison to said overflow particles without recycling underflow particles and at least 20 percent of said overflow particles being of a size large enough for retention on a 150 standard mesh screen.

2. A method as in claim 1 in which the weight ratio of said removed overflow particles to said removed underflow particles is at least 5 to 95 parts, respectively.

3. A method as in claim 1 in which the fiber content of said removed overflow particles removed from said separation chamber is substantially reduced in comparison to said fed hay powder.

4. A method as in claim 1 in which at least part of the recycled underflow particles is pulverized prior to recycling to mixing with said supply of hay powder.

* * * * *